G. L. MILLER.
TREE COVER.
APPLICATION FILED APR. 21, 1916.

1,233,099.

Patented July 10, 1917.

WITNESS
R. F. Dilworth

INVENTOR
George L. Miller
By H. W. Stevenson
Attorney

UNITED STATES PATENT OFFICE.

GEORGE L. MILLER, OF PITTSBURGH, PENNSYLVANIA.

TREE-COVER.

1,233,099.     Specification of Letters Patent.     Patented July 10, 1917.

Application filed April 21, 1916. Serial No. 92,588.

*To all whom it may concern:*

Be it known that I, GEORGE L. MILLER, a citizen of the United States, residing at Pittsburgh, in the county of Allegheny and State of Pennsylvania, have invented a certain new and useful Improvement in Tree-Covers, of which the following is a specification.

My invention relates to covers and protectors for fruit trees, being especially designed to guard against damage or loss of the fruit, which is usually attributed to frost, hail, excessive rains, also from blight of various kinds.

It is a well known fact that great financial loss to fruit growers frequently occurs when their budding orchards are subjected to the damaging influences of frosts, hail, freezing, heavy rains, and in order to protect the tender buds against such devastating weather conditions various means have been experimented with to counteract these destroying agencies, such for instance as smudge pots and similar devices of doubtful merit.

It is my aim to provide a simple and comparatively inexpensive cover that can be quickly placed over the tree, without any material injury to the tree or damage to the budding fruit, affording a positive protection and insurance against sudden drops in the temperature, and giving to the grower assurance of a regular fruit crop.

I propose manufacturing this tree cover out of any suitable material that will not be affected by exposure to the weather, medium weight duck or water proof fabric being preferable, although oiled paper and similar substance could be advantageously employed.

In the accompanying drawing I have shown one embodiment of my invention, which is merely illustrative of my preferred form, the same however being susceptible of modification that will confine it within the scope of the claims.

Figure 1:
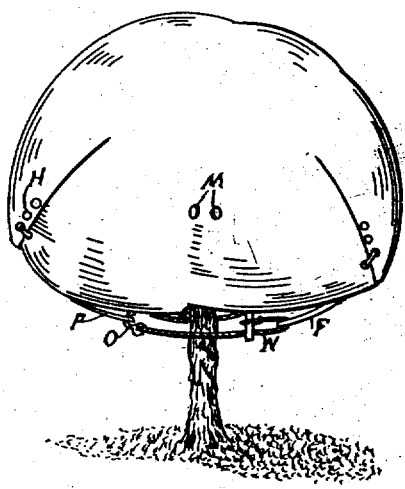
Figure 2:
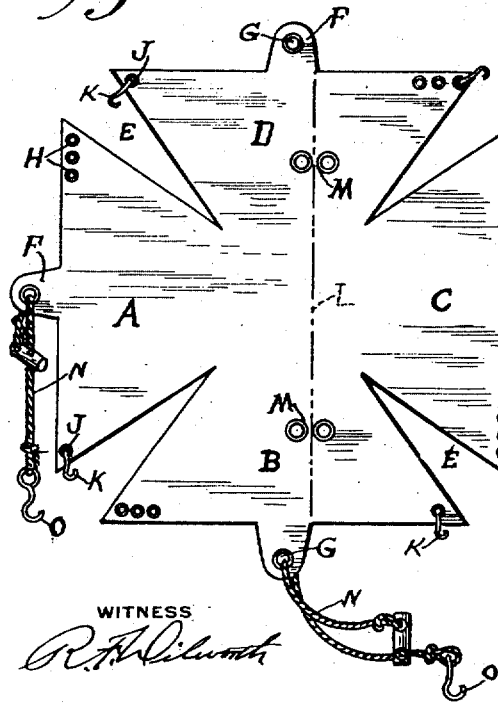

Referring then to said drawing Figure 1 illustrates the application of my cover to a tree or bush; Fig. 2 is a plan view of the cover in full extended formation, and Fig. 3 is a plan view showing the cover in its partially folded attitude ready for placing over the tree.

As shown the cover, when laid out flat, involves a plurality of approximately triangular shaped segments or radial flaps A, B, C and D respectively, they being separated from each other by radial V-shaped spaces E, each flap having a projecting tongue or extension F, approximately midway of the outer edge, which flap is supplied with an eyelet or suitable aperture G.

The corner section of each flap, at one side of the imaginary center line, is provided with a series of apertures or eyelets H, while the opposite corner necessarily carries but one aperture J, for receiving one end of a hook member K. A slight modification of this arrangement of eyelets and hooks is shown in Fig. 2, where the flap C has two series of apertures, and the flap D carries two hooks, the requirement being that there shall be a hook contiguous to each series of apertures of the adjacent flap.

Figure 3:
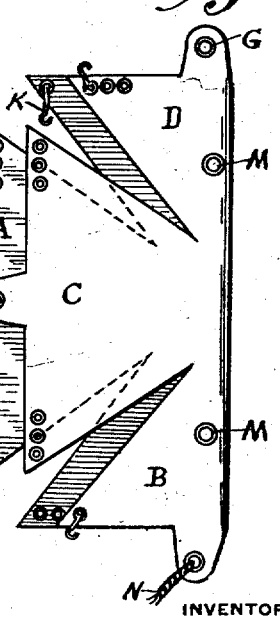

A little to one side of the imaginary center line extending from side to side of the cover is a folding line L, and one each side of this folding line are the two pairs of spaced apart apertures M, which are designed to register, one with the other, whenever the flap C is in its partially folded attitude shown in Fig. 3.

In the eyelet G of two of the projecting tongue portions F there is attached a slip noose or self locking draw string N, which is supplied at its free end with a hook member O.

The operating steps required to place my fruit tree cover in its functional position is extremely simple and involves first, the folding of the cover as shown in Fig 3, whereby the eyelets M will be brought into registering engagement with each other in order to permit of the insertion of a suitable pole or other lifting medium.

In order to expedite the placement of my tree cover it is preferable to employ two operators, especially when the size and weight of cover will justify, each one handling an elevating pole, not shown however, and by a concerted lifting movement the cover, in its partially folded attitude, is easily and quickly elevated slightly above the highest branches or limbs, and then gently lowered until it rests on and is supported by the tree itself. The poles are then withdrawn, and the previously folded over portion of the cover is permitted to drop into approximately vertical alinement with the remaining section, thereby partially surrounding and covering the major portion of the tree. The hooks K are next entered in one of the series of apertures H of the adjacent flap, thus closing or lessening the division gap or space E, locking the flaps together, but preferably permitting a slight opening at all fastening points, whereby a circulation of air will prevail so as to avoid lifting or shifting of the cover during excessive winds.

After the flaps have been hooked together both the draw strings N are brought over underneath the lower limbs of the tree, crossing each other close to the tree trunk, and the hooks O made to engage in the aperture of the diametrically opposite tongue portion F, after which the slip noose is utilized to take up any slack necessary to properly draw the flaps toward a common center, or in the direction of the tree trunk, thereby causing the cover to infold the tree sufficient to carry out its intended function of protecting the fruit.

The removal of the cover, after all danger from loss by weather conditions has passed, constitutes practically a reverse operation from that just described, when applying the device, the elevating poles, not shown, again being called into service in order to lift the cover clear of the tree.

When not in use the cover can be folded into a comparatively small space, properly ventilated to prevent deterioration, and packed away until needed again. A large orchard can be thus covered in a short space of time, and the grower have a positive insurance against loss of his fruit.

It is readily apparent that my tree cover can be constructed in a number of modified ways and out of one or more pieces of material determined by a further reduction to practice, and that various changes in the detail form and configuration is possible and permissible without departing from the original idea and intention.

What I claim as my invention is:—

1. A tree cover comprising a plurality of separated marginally apertured flaps; hook means for removably uniting the marginal edges of the adjacent flaps; and adjustable means carried by a portion of said flaps for drawing the diametrically opposite flaps in the direction of a common center.

2. A tree cover comprising a plurality of separated flaps, each flap having a plurality of marginal eyelets; hooks carried by the flaps adapted to removably engage in the eyelets of adjacent flaps; and a slip noose carried by the flaps, said noose having a hook adapted to removably engage in an eyelet of the diametrically opposite flap, for drawing the flaps in the direction of a common center.

3. A tree cover comprising a plurality of separated flaps, each flap having a plurality of marginal eyelets; a folding line; eyelets formed at each side of said line; hooks carried by the flaps adapted to removably engage in the eyelets of adjacent flaps; and a slip noose having a hook adapted to removably engage in an eyelet of the diametrically opposite flap, for drawing said flaps in the direction of a common center.

In testimony whereof I affix my signature this 19th day of February, 1916, at Pittsburgh, Penna.

GEORGE L. MILLER.

Copies of this patent may be obtained for five cents each, by addressing the "Commissioner of Patents, Washington, D. C."